Feb. 21, 1961 R. R. MICKUS ET AL 2,972,197
CONTINUOUS VIBRATORY HEATING APPARATUS
Filed July 19, 1954 2 Sheets-Sheet 1
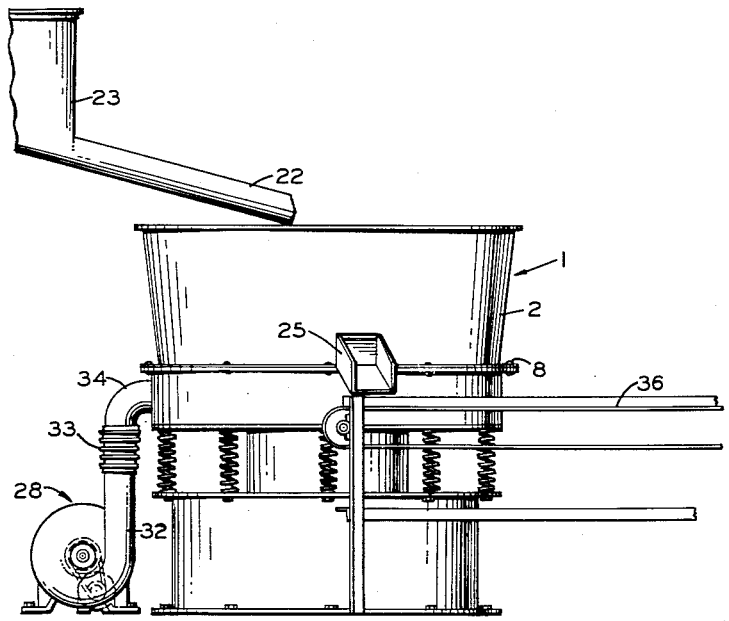
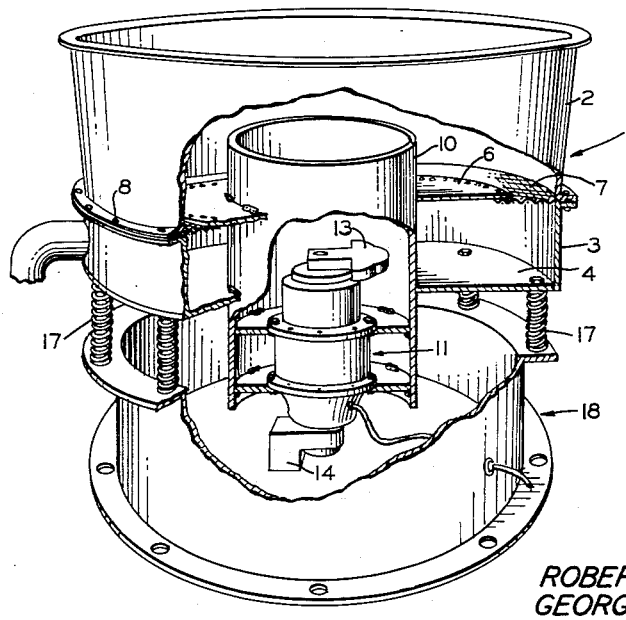
INVENTORS
ROBERT R. MICKUS
GEORGE W. BREWER
BY Boyken, Mobler & Wood
ATTORNEYS

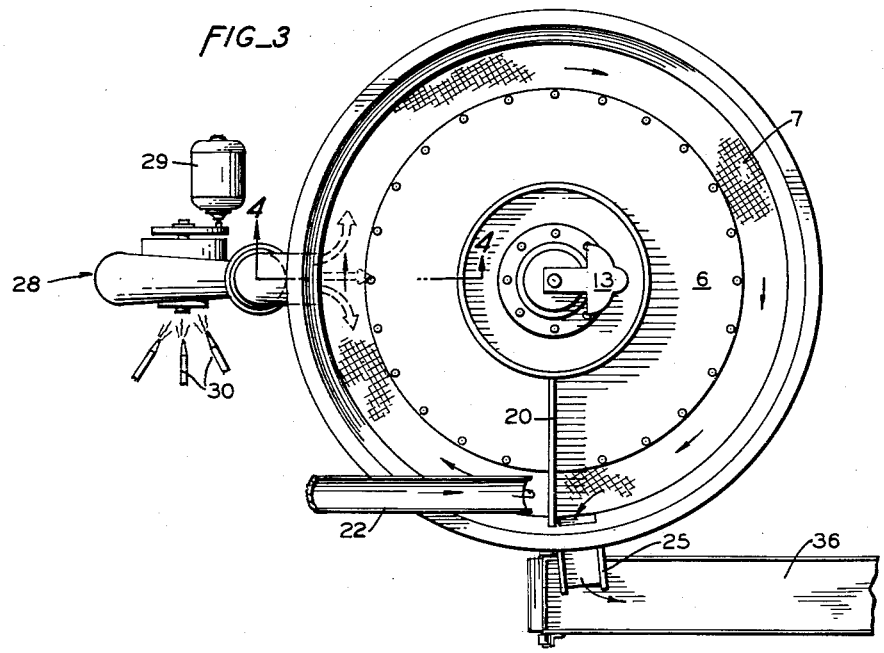
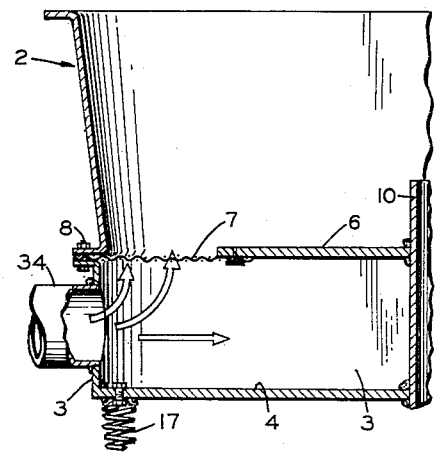
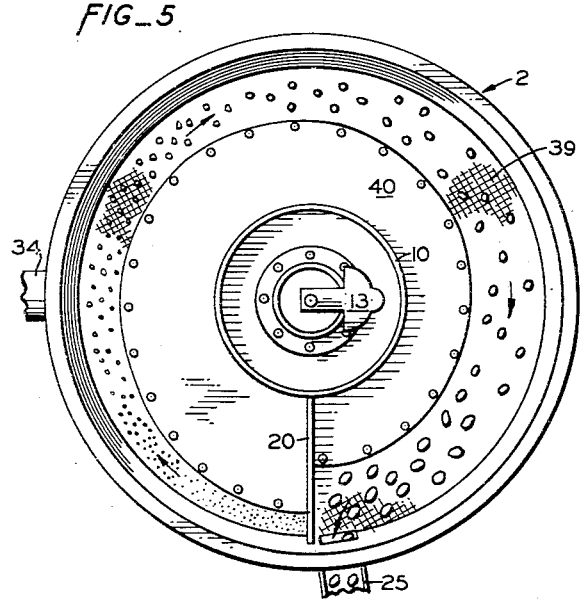

United States Patent Office 2,972,197
Patented Feb. 21, 1961

2,972,197
CONTINUOUS VIBRATORY HEATING APPARATUS

Robert R. Mickus and George W. Brewer, Sacramento, Calif., assignors to Rice Growers Association of California Filed July 19, 1954, Ser. No. 444,182

1 Claim. (Cl. 34—164)

This invention relates to an apparatus for continuously heating material composed of discrete particles and is, in some respects, related to copending applications Serial No. 390,923 dated November 9, 1953, now U.S. Patent No. 2,808,333, and Serial No. 394,688 dated November 27, 1953, now abandoned.

Heretofore it has been customary to heat materials such as rice, coffee, corn, nuts and the like by the batch method; that is, by processing a predetermined quantity of material at a time under controlled conditions of temperature and time. Although such a batch method lends itself to operation under accurately controlled conditions, it is wasteful and inefficient for obvious reasons.

Although it is extremely desirable to employ a "continuous," as opposed to a batch operation in such instances, no satisfactory method or apparatus has heretofore been evolved, presumably because accurate control over the material has not been made possible.

The main object of the present invention is, therefore, the provision of a novel apparatus for permitting continuous heating of material composed of discrete particles without the disadvantages attending the use of the batch method.

Another object of the invention is the provision of an apparatus for expanding or "popping" certain granular materials such as rice, corn and the like.

Still another object of the invention is the provision of an apparatus for dry heating materials normally requiring fat as a heating medium, such as pop-corn, potato chips, and the like, thereby avoiding raising the caloric content of such materials.

Other objects and advantages will be seen in the following specification and in the drawings wherein:

Fig. 1 is a side elevation of the preferred form of apparatus employed in carrying out the invention.

Fig. 2 is a greatly enlarged side elevation of a portion of the apparatus of Fig. 1 with parts of the same broken away and in section to show internal structure.

Fig. 3 is a top plan view of the apparatus of Fig. 1.

Fig. 4 is a fragmentary cross section of the apparatus showing schematically the path of the heated air relative to the material support.

Fig. 5 is a top plan view of a modified form of the invention.

By the present invention the material to be heated or popped is conveyed on a support along a predetermined path of travel and a stream of heated air is directed through said material transversely of the support. In the preferred form of the apparatus the material support is a perforated surface such as a screen and the air is directed upwardly through the screen in a manner to be described.

In order to expose the material to heat for a predetermined length of time it is necessary that a positive control be exercised over the speed of the material along the conveyor to avoid underheating on the one hand and burning on the other hand. This control may be accomplished by use of the apparatus shown in the drawings wherein the numeral 1 generally designates a generally tubular housing having an upper compartment 2 open at its upper end and a lower closed compartment 3 having a bottom 4.

Separating the upper compartment 2 and the lower compartment 3 is a central imperforate plate 6 to the periphery of which is secured an annular screen 7 of relatively fine mesh and which screen extends between said plate 6 and the cylindrical sidewalls of compartment 2.

The upper and lower compartments 2, 3 may be peripherally secured together by a row of bolts 8 so that said compartments constitute a unit.

Extending through the plate 6 and the bottom 4 centrally the same is a cylindrical housing 10 within which is mounted an electric motor 11 arranged with its shaft vertical and coaxial with housing 10. On the upper end of the motor shaft an eccentrically mounted weight 13 is secured and on the lower end of the motor shaft an eccentrically arranged weight 14 is provided (Fig. 2).

The above briefly described structure is substantially the same as that disclosed in United States Patent No. 2,284,671 entitled "Shaking Device," issued to Meinzer on June 2, 1942, and to which reference is made for features of construction and operation not described herein in detail.

As shown in the above cited patent the housing 1 is supported on the upper ends of a plurality of helical compression springs 17, the lower ends of which are secured to a base member generally designated 18. As described in Patent No. 2,284,671, rotation of the shaft of motor 11 with its eccentric weights causes vibration of housing 1 with a relatively small applitude in such a manner that material resting on the plate 6 or screen 7 is agitated so as to move in a generally radial direction. By adjusting the eccentricity of the weights 13, 14, a tangential component may be imparted to material in the upper compartment 1 so that the same traverses a generally arcuate path of travel.

In the shaking device disclosed by the reference patent it is contemplated that material to be graded is fed into the upper compartment about centrally of the same and proceeds generally radially outwardly because of the vibration, during which time small particles drop through into the lower compartment 3 and the larger particles are collected adjacent the periphery of the upper compartment 2. This grading function is not employed by the present invention.

By the present invention advantage is taken of the fact that, although the screen 7 is substantially horizontal, the vibration is such as to cause a progression of the material thereon in a circular path of travel when the weights 13, 14 are properly adjusted to effect such a result.

At a point on the annular support effected by the plate 6 and the screen 7 a radially extending baffle 20 is provided which is secured at one end to the upper end of the inner cylindrical housing 10 and at the other end to the inner side of the sidewalls of compartment 2 (Fig. 3).

A feed spout 22 is provided above the compartment 2 along which the material to be heated is conveyed from a hopper 23 to a point above the screen 7 and on one side of the baffle 20. The feeding of material to the screen 7 is preferably established at a uniform rate by any one of many known devices for regulating the flow from hopper 23.

If it is assumed that the direction of rotation of the motor 11 and the disposition of the eccentric weights 13, 14 is such as to cause clockwise progression of the material around screen 7 (Fig. 3) such material will ultimately arrive on the opposite side of baffle 20 from which it entered and may be discharged through a discharge spout 25 formed in the sidewall of upper compartment 2 (Figs. 1, 3). It is extremely important to note that not only are all particles of the material similarly agitated as they proceed along the circular path of travel but all particles remain on the screen substantially the same length of time.

Alongside the base member 18 is an air blower generally designated 28 which may be driven in any convenient manner by a variable speed electric motor 29 (Fig. 3). Adjacent the inlet of blower 28 there are provided one or more burners 30, schematically indicated in Fig. 3, for heating the air supplied to blower 28. The discharge pipe 32 (Fig. 1) of blower 28 is directed upwardly and is connected by means of a flexible coupling 33 with an air inlet spout 34 provided on the lower compartment 3. The flexible coupling 33, which is preferably of the bellows construction, prevents vibrations of the housing 1 from being transmitted to the blower 28.

The only means of escape of the heated air entering the lower compartment 3 is upwardly through the screen 7 and through the material thereon. It will be apparent that the speed of the blower 28 may be maintained at a predetermined rate and likewise the heat supplied by the burners 30 to the inlet air. Inasmuch as the rate of travel of the material to be heated along the screen 7 may be made uniform as described above, it will be apparent that every particle is subjected to exactly the same amount of heat for exactly the same length of time. It will further be apparent that the speed of motors 11 and 29 may be varied along with the heat output of burners 30 to obtain any desired result. Thus all of the advantages of batch heating are available with none of the disadvantages.

The heated material discharged from discharge spout 25 may be fed onto a conveyor 36 for further disposition or packaging as desired.

If the material to be heated is composed of particles which increase considerably in size upon being heated, it is preferable to modify the screen so that the same progressively increases in width from the material inlet side to the material outlet side of the baffle 20. Thus in the structure of Fig. 5 all elements are the same as above described except that the screen 39 is relatively narrow at the point where the material falls thereon and gradually increases in width to the discharge spout 25. In such a case, the central horizontal plate 40 corresponding to the central plate 6 of Fig. 3 is complementarily formed as shown in Fig. 5.

By the structure of Fig. 5, the density of the material may be made the same at all points along its path of travel thus effecting economy of time and heat.

It will be noted that the vibration of the housing 1 is such that there is little or no tendency for the material to shift radially inwardly of the screen onto the central horizontal plate 6. Inasmuch as the central cylindrical housing 10 extends above the plate 6, said housing acts as a baffle so that the material is prevented from jumping diametrically across the housing and must follow the predetermined path along the screen. If some particles land on the imperforate plate 6 the same are vibrated radially outwardly onto the annular screen as this is a characteristic of the shaker structure disclosed in the reference patent.

We claim:

Apparatus for uniformly heating material composed of discrete particles comprising: a horizontally disposed annular screen adapted to support such material thereon, means for conveying material to a first point on said screen adjacent the periphery thereof and means for receiving material from said screen at a second point adjacent the periphery thereof and spaced circumferentially substantially 360° from said first point, means for agitating said screen at all times for continuously imposing equal forces on said particles having unidirectional vertical and tangential components whereby said material is progressively moved by agitation from said first point to said second point along a generally circular path of travel, and means for directing heated air upwardly through said screen during said movement, and a circular baffle supported with said screen radially inwardly thereof for preventing movement of said particles diametrically of said screen.

References Cited in the file of this patent

UNITED STATES PATENTS

| | | |
|---|---|---|
| 836,325 | Kevlin | Nov. 20, 1906 |
| 1,043,158 | Simmons | Nov. 5, 1912 |
| 1,672,274 | Noftzger | June 5, 1928 |
| 2,024,934 | Lellep | Dec. 17, 1935 |
| 2,192,041 | Headland | Feb. 27, 1940 |
| 2,284,671 | Meinzer | June 2, 1942 |
| 2,541,859 | Callaghan et al. | Feb. 13, 1951 |
| 2,586,818 | Harms | Feb. 26, 1952 |
| 2,666,711 | Crossett | Jan. 19, 1954 |